United States Patent Office 3,150,086
Patented Sept. 22, 1964

3,150,086
METHOD OF INHIBITING CORROSION IN FERROUS METAL CONTAINERS EXPOSED TO THE ATMOSPHERE
Glenn A. Marsh and Robert L. Littler, Crystal Lake, Ill., assignors to The Pure Oil Company, Palatine, Ill., a corporation of Ohio
No Drawing. Filed Sept. 29, 1961, Ser. No. 141,598
7 Claims. (Cl. 252—8.55)

This invention relates to new and useful improvements in methods for preventing corrosion of ferrous metals in water storage tanks, and particularly for preventing corrosion in storage tanks in which water is exposed to air.

In oil-field waterflood operations, it is common practice to use substantially closed water systems. In such systems, the water which is injected into a subterranean formation is not subjected to contact with air and corrosion problems are minimized. However, it is often not possible to design water-injection systems so that the injection rate exactly equals the rate at which the source water is produced. In such cases, it is necessary to use a surge tank which is generally open to the atmosphere. Oil-field surge tanks are generally of ferrous metals and are subject to extensive corrosion as a result of dissolved oxygen.

In the past, attempts have been made to reduce evaporation of water and to prevent dissolution of oxygen across an air-water interface in a storage tank to minimize the concentration of dissolved oxygen in the water and thereby mitigate corrosion. Methods which have been used have included the use of inert gas blankets (i.e., a nitrogen atmosphere over the water in a tank), floating-roof tanks, floating layers of plastic "micro-balloons," etc. Another attempted technique has been the use of an oil layer on the surface of the water in the tank. This, of course, would be the least expensive and most practical method of all those tried, but unfortunately, oxygen from the air readily dissolves in the oil layer and transfers across the oil-water interface into the water. Consequently, an oil layer floating on the water does not provide a real barrier to the dissolution of air in the water, and the use of such a layer has little or no effect on the rate of corrosion caused by dissolved oxygen.

It is therefore one object of this invention to provide a means for inhibiting corrosion of ferrous metals resulting from dissolved oxygen in ferrous metal storage tanks containing water exposed to air.

Another object of this invention is to provide a water storage tank arrangement useful as a surge tank, and provided with means to prevent corrosion of the tank resulting from dissolved oxygen in the water.

A feature of this invention is the provision of a ferrous metal container containing water exposed to air and having a liquid layer floating on the water to prevent dissolution of oxygen in the water, said layer being selected from the group consisting of oil-soluble quaternary ammonium salts and solutions of said salts in a concentration of not less than about 50% in oil.

A further feature of this invention is the method of storage of water in ferrous metal containers exposed to the atmosphere, in which a layer of liquid is floated on the water to prevent dissolution of oxygen in the water, said liquid being selected from the group consisting of oil-soluble quaternary ammonium salts and solutions of said salts in oil in a concentration of not less than about 50%.

Other objects and features of this invention will become apparent from time to time throughout the specification and claims as hereinafter related.

This invention is based on the discovery of a superior method for preventing corrosion in water surge-tanks and the like, such as are used in water-injection systems for the secondary recovery of petroleum. Our method consists essentially of floating on the surface of water in a surge tank, a thin layer of a substantially water-insoluble quaternary ammonium salt or a water-insoluble solution of said salt in an oil in a concentration of at least about 50%. The thickness of the oily layer is not critical although there is some indication that thicker layers provide slightly better protection against corrosion. We prefer to use a layer of quaternary ammonium salt, or an oil solution of said salt, which is in the range from about ¼ inch to 2 inches in thickness, although thinner or thicker layers can be used if desired. Water-soluble amines and amine salts are known to have corrosion-inhibiting properties. However, the use of such corrosion inhibitors in the very large quantities of water used in water-injection systems for secondary recovery of petroleum is impractical. Our invention is based upon the discovery that oil-soluble (water-insoluble) quaternary ammonium salts and oil solutions thereof can be floated on the surface of water in surge tanks (or any ferrous metal storage tank) to provide a barrier protecting the water against the air and providing substantially permanent protection since there is practically no loss of the corrosion inhibitor with the water as it is introduced into and withdrawn from the storage tank. Quaternary ammonium salts which are used in the practice of our invention are compounds of the formula, $R_1R_2R_3R_4NX$, where $R_1$, $R_2$, $R_3$, and $R_4$ are $C_1$–$C_{30}$ alkyl groups, at least one of which is at least twelve carbon atoms in length, and X is a non-oxidizing anion, such as chloride, bromide, fluoride, iodide, sulfate, phosphate, acetate, oxalate, citrate, propionate, caprate, laurate, stearate, oleate, benzoate, etc. Preferred compounds within the above formula which are commercially available, and thus the most practical, are compounds in which the quaternary ammonium group has two or three methyl substituents and the other substituent (or substituents) is a mixture of long-chain alkyl (and alkenyl) radicals derived from naturally occurring fats and fatty materials. These quaternary salts are available from the Armour Chemical Division of Armour & Co. under the trade name Arquad. Arquads that can be used in this process include Arquad 16 (hexadecyl trimethyl ammonium chloride), Arquad 18 (octadecyl trimethyl ammonium chloride), Arquad T (N-tallow trimethyl ammonium chloride, "tallow" being a symbol for a mixture of radicals (derived from tallow) in the following approximate proportions: hexadecyl 30%, octadecyl 25% and octadecenyl 45%), Arquad S (N-soya trimethyl ammonium chloride, "soya" being a symbol for a mixture of radicals (derived from soya oil) in the following approximate composition: hexadecyl 10%, octadecyl 10%, octadecenyl 35%, and octadecadienyl 45%), Arquad C (N-coco trimethyl ammonium chloride, "coco" being a symbol for a mixture of radicals (derived from coconut oil) of approximately the following composition: octyl 8%, decyl 9%, dodecyl 47%, tetradecyl 18%, hexadecyl 8%, octadecyl 5%, and octadecenyl 5%), Arquad–2T (di-tallow, dimethyl ammonium chloride, where the tallow group is as previously defined), Arquad–2S (di-soya dimethyl ammonium chloride), and Arquad–2C (di-coco dimethyl ammonium chloride). These compounds can be applied as thin layers to the surface of the water in a storage tank, and are effective in mitigating corrosion resulting from absorbed oxygen. The quaternary compounds containing longer-chain alkyl groups and containing two long-chain groups are preferred since these compounds have a lower solubility in water and a higher solubility in oil. Some of the lower-molecular-weight quaternary compounds are somewhat water-soluble and are used in an oil solution in a concentration of about 50% or more. When these compounds are added in the form of an oil solution, the layer of solution functions as an oxygen barrier and prevents corrosion resulting from absorbed oxygen. These quaternary salts, although slightly soluble in water, do not tend to leach out of the oil solution to any substantial amount and thus are effective over extended periods of time. As previously indicated, the quaternary ammonium salts which are useful in carrying out this invention can include any non-oxidizing anion and include all oil-soluble, substantially water-insoluble, salts within the general formula given.

The following non-limiting examples are illustrative of the scope of this invention.

*Example I*

A series of experiments was conducted in which de-aerated water, containing a small amount of sodium chloride (about 3%), was placed in a 1-liter beaker and evaluated for the extent of corrosive attack on ferrous metals. The water, with and without various protective layers, was evaluated for corrosivity by a corrosion-test probe immersed in the water. The corrosion-test probe was of the type which measures corrosion of an exposed ferrous metal element relative to an element protected against corrosion and is connected through an electrical bridge circuit to a meter which is calibrated to indicate total corrosion in micro-inches. This measurement is plotted against time of exposure to the corrosive environment and converted to corrosion rate in micro-inches per hour.

In the first experiment a 3% solution of sodium chloride was evaluated for corrosivity over a period of 40 hours using the corrosion-test probe. The solution, without the benefit of any protective layer, corroded the metal probe at a rate of 0.9 micro-inch per hour.

In a second experiment, the solution was covered with a ¼-inch layer of Duomeen T Dioleate (a product of Armour & Co., N-tallow trimethylene diamine dioleate) and measured for corrosive attack on the test probe. The corrosion measurement was carried out over a period of about 25 hours and the solution was found to corrode the test probe at a rate of 1.1 micro-inches per hour.

In still another experiment, the solution was covered with a ¼-inch layer of oleic acid and measured for corrosive attack on the test probe. The corrosion measurement was carried out over a period of about 25 hours and the test probe was corroded at a rate of about 1.1 micro-inches per hour.

In still another experiment, a 900 ml. portion of the solution in a 1-liter beaker was covered with a ¼-inch layer of white oil. The solution was measured for corrosivity using the test probe for a period of 40 hours and was found to corrode the probe at the rate of 0.45 micro-inch per hour. In another experiment, castor oil (Baker's castor oil No. 3) was substituted for the white oil as a protective layer on the solution and the corrosive attack on the test probe was found to be at a rate of about 0.25 micro-inch per hour.

*Example II*

In another series of experiments, the 3% salt solution was evaluated for corrosivity on the test probe when the solution was protected by quaternary ammonium salts, alone or in oil solution.

In one experiment, the solution was covered with a ¼-inch layer of a 50/50 mixture of Arquad T and Arquad-2C. The solution was measured for corrosive attack on the test probe and was found to corrode the probe at a rate of less than 0.2 micro-inch per hour during the first 20 hours, after which the corrosion rate decreased substantially to 0.

In another experiment, the dilute salt solution was covered with a ¼-inch layer of a 10% solution in white oil of the 50/50 mixture of Arquad T and Arquad-2C. This solution was found to have a rate of corrosive attack on the test probe which was substantially the same as was found for the solution covered with a layer of white oil containing no quaternary salt. When the concentration of the 50/50 mixture of Arquad T and Arquad-2C and white oil is increased to 50% or more, the initial corrosion rate decreases to a value less than about 0.2 micro-inch per hour and decreases substantially below that corrosion rate over an extended period of time.

*Example III*

In another series of experiments, the nature of the protection against corrosion provided by the quaternary ammonium salts was investigated by measuring the corrosion rate in the presence of a liquid layer of quaternary salt and then removing the liquid layer and measuring corrosion rates thereafter.

In one experiment, a beaker containing 3% salt solution covered with a ¼-inch layer of a 50/50 mixture of Arquad T and Arquad-2C was measured for rate of corrosion using the test probe. For a period of 24 hours the solution attacked the test probe at a substantially constant rate of about 0.3 micro-inch per hour. At the end of this time, the layer of quaternary salt was removed and corrosion measurement was continued. During the next 24 hours the corrosion took place at a rate of 1.4 micro-inches per hour, after which the corrosion rate increased still further to a value of about 3.2 micro-inches per hour.

In another experiment, the salt solution was covered with a ¼-inch layer of a 50% solution of the 50/50 mixture of Arquad T and Arquad-2C in castor oil, and the solution was evaluated for corrosive attack on the test probe. During the first 45 hours of measurement, the test probe was corroded at a rate of about 0.3 micro-inch per hour. At the end of about 46 hours and for several hours thereafter, the rate of corrosion leveled off and became practically 0. The liquid layer on the solution was removed at the end of about 54 hours and corrosion measurement was continued. Almost immediately after the removal of the corrosion-inhibiting layer, the rate of corrosion increased sharply and continued at a value of about 1.0 micro-inch per hour for the next 15 hours, at which time the measurement was terminated.

When other oil-soluble quaternary ammonium salts, as previously described, are placed as a liquid layer over water or corrosive salt solutions, the corrosive attack on ferrous metals is reduced substantially in the same manner as described in the foregoing examples. In some cases it is desirable to provide the quaternary salt in the form of a solution (at least 50% concentration) in an oil. The oils which can be used include mineral oils, fatty oils, and synthetic oils, such as synthetic hydrocarbon polymers, esters (e.g., dioctyl sebacate, tricresyl phosphate, etc.), silicones, polyalkylene glycols, fluorocarbons, and other synthetic oils. In protecting a ferrous metal storage tank or container from corrosion due to dissolved oxygen in the water contained therein, it is sufficient merely to cover the water in the tank with a thin layer of the quaternary salt in an oil. The feed of the water to the tank and withdrawal of the water from the tank is preferably from the bottom or side at a point located so that the liquid layer on the surface of the water is not disturbed and is not withdrawn with the water.

While we have described our invention fully and completely with special emphasis on several preferred embodiments thereof we wish it to be understood that within the scope of the appended claims this invention may be practiced otherwise than specifically described therein.

The embodiments of the invention in which an exclusive property or privilege is claimed are defined as follows:

1. In the storage of water in ferrous metal containers exposed to the atmosphere, the improvement of floating on the surface of the water a layer of a liquid selected from the group consisting of oil-soluble, substantially water-insoluble, quaternary ammonium salts and solutions of said salts in oil in a concentration not less than about 50%, whereby corrosion of the metal container is substantially reduced.

2. A method in accordance with claim 1 in which the quaternary salt is a mixture of N-tallow trimethylammonium chloride and di-N-coco dimethylammonium chloride.

3. A method in accordance with claim 1 in which the quaternary salt is of the formula $(CH_3)_n R_{4-n} NCl$ where $n$ is an integer from the group consisting of 1 and 2 and R is a mixture of alkyl radicals derived from naturally occuring fats.

4. A method in accordance with claim 3 in which the quaternary salt is N-tallow trimethylammonium chloride.

5. A method in accordance with claim 3 in which the quaternary salt is di-N-coco dimethylammonium chloride.

6. The method of inhibiting corrosion as defined in claim 1 in which the oil-soluble salt is of the formula $R_1R_2R_3R_4NX$, where $R_1$, $R_2$, $R_3$, and $R_4$ are $C_1$–$C_{30}$ alkyl groups, at least one of which is at least twelve carbon atoms in length, and X is a non-oxidizing anion.

7. A method in accordance with claim 6 in which the quaternary salt is in solution in an oil selected from the group consisting of mineral oil, fatty oils, and synthetic oils.

References Cited in the file of this patent

UNITED STATES PATENTS 1,814,053    Mueller et al. _____ July 14, 1931

FOREIGN PATENTS 579,933    Canada _____ July 21, 1959

OTHER REFERENCES

La Susa, Corrosion in Water Flood and Disposal Systems, article in World Oil, April 1955, pages 242, 244 and 245.

Speller, Corrosion Causes and Prevention, Third edition, published 1951 by McGraw-Hill Book Co. Inc., New York, pages 163, 165 and 361.

Arquads, Quaternary Ammonium Salts, publication by Armour Industrial Chemical Co., Chicago 6, Ill., 1956, page 3.